Mar. 3, 1925. 1,528,406

I. DAVIDSON

ICE CREAM DISHER

Filed March 13, 1924

Inventor.
Isidore Davidson

By George A. Prevost
Attorney

Patented Mar. 3, 1925.

1,528,406

UNITED STATES PATENT OFFICE.

ISIDORE DAVIDSON, OF NEWARK, NEW JERSEY.

ICE-CREAM DISHER.

Application filed March 13, 1924. Serial No. 698,913.

*To all whom it may concern:*

Be it known that I, ISIDORE DAVIDSON, citizen of the United States, residing at Newark, in the county of Essex and State of New Jersey, have invented certain new and useful Improvements in Ice-Cream Dishers; and I do hereby declare the following to be a full, clear, and exact description of the invention, such as will enable others skilled in the art to which it appertains to make and use the same.

My invention relates to new and useful improvements in ice cream dishers, and has for its object to provide a device simple in construction, which is adapted to receive a cone to be filled with ice cream.

Another object of my invention is that the ice cream is inserted in the cone, and does not merely rest upon the top thereof, as in the devices now in use, thus avoiding the possibility of the ice cream rolling off onto the ground while passing the cone from server to buyer.

A still further object of my invention is to keep the cone absolutely sanitary, the only handling necessary being the placing of the same in the cone retainer. The cone is filled while in the retainer, and can be removed from the said retainer by the purchaser.

By this improved method, much time and labor is saved, and the possibility of crushing the cone in the hand while filling the same, is prevented.

With the above and other objects in view which will appear as the description proceeds, my invention consists in the novel features herein set forth, illustrated in the accompanying drawing, and more particularly pointed out in the appended claims.

Referring to the drawing,—

In the drawings, numerals of like character designate similar parts throughout the several views.

1 represents a cone-shaped receptacle or retainer composed of aluminum or any suitable material, which is adapted to receive a cone, and being slightly longer than said cone, its upper edge extending beyond the edge of the cone and forming a cutter for the ice cream to be dished. 2 is a handle of ordinary structure, secured to said retainer by riveting or any suitable means as at 3. Below said handle 2 and extending downwardly therefrom is a slot 6, hereinafter referred to.

Figure 1:
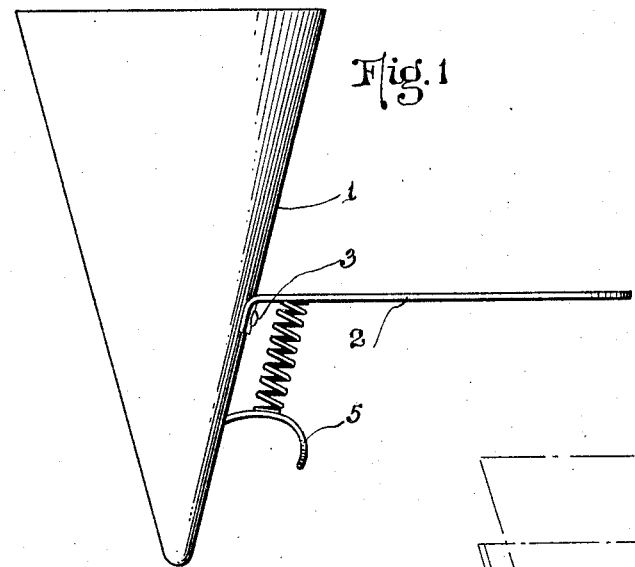
Fig. 1 is a side view of my device, showing the handle, spring and operating lever.
Figure 3:
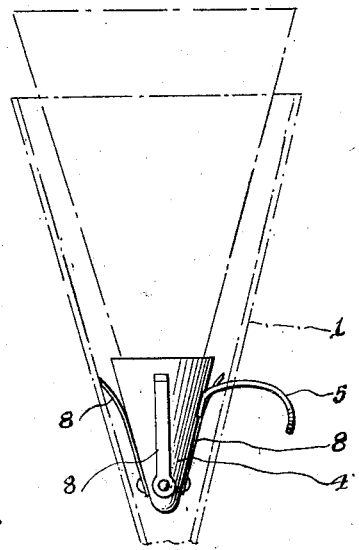
Fig. 3 is a modification, showing a plurality of centering springs attached to the dispensing cup.
Figure 2:
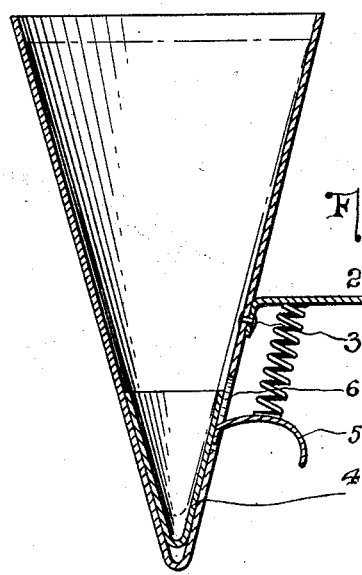
Fig. 2 is a sectional view of Fig. 1, showing the cone-shaped dispensing cup and means for operating the same.

4 designates a cone-shaped dispensing cup, adapted to receive the lower portion of a cone, as shown in Fig. 3, and having secured thereto a lever 5 which operates in the slot 6 of the cone retainer.

Interposed between said handle 2 and lever 5, is a spring 7 of any kind, which acts to return the dispensing member 4 to its original position after the cone has been removed.

Referring to the modification shown in Fig. 3, 8 represents a plurality of spring members secured to the dispensing member 4, and adapted to engage the inner wall of the retainer 1, to steady the member 4 and keep the same in alignment with the center of said retainer, thus avoiding the possibility of twisting the cone and breaking the lower portion thereof.

The operation of my device is obvious. An empty cone is placed in the retainer 1, the lower portion thereof fitting within the member 4. The disher is then inserted in the ice cream container in the usual manner, by gripping the handle 2, and the cone is filled. The index finger then grips the lever 5, pulling the same upwardly and with it the cone dispensing member 4, which places the filled cone in a position to be removed by the purchaser.

It will be noted by the use of my device, that the ice cream may be packed into the cone as tightly as desired without fear of crushing the cone, its wall being reinforced by the retainer, and the cutting edge of the said retainer projecting beyond the edge of the cone.

From the foregoing it is believed that my invention may be clearly understood without further description, it being borne in mind that numerous changes may be made in the details of construction without departing from the spirit of the invention as disclosed in the appended claims.

What I claim and desire to secure by Letters Patent is:—

1. An ice cream disher including a cone retainer of a shape similar to that of a cone, the upper edge of the walls of said retainer projecting beyond the edge of a cone when the latter is inserted therein, a handle on said retainer, a dispensing cup, of a similar shape to the retainer, provided with a lever, said lever operating in a slot in said retainer, a plurality of resilient centering members on said dispensing cup, and a spring member for returning said dispensing member to its original position.

2. An ice cream disher as claimed in claim 1, wherein said dispensing member is provided with a plurality of centering springs, adapted to engage the inner surface of said retainer.

In testimony whereof I affix my signature.

ISIDORE DAVIDSON.